April 19, 1955 L. G. SAYWELL 2,706,650
SEALING ASSEMBLY
Filed Dec. 3, 1949
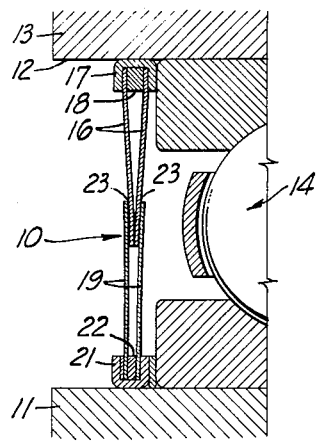
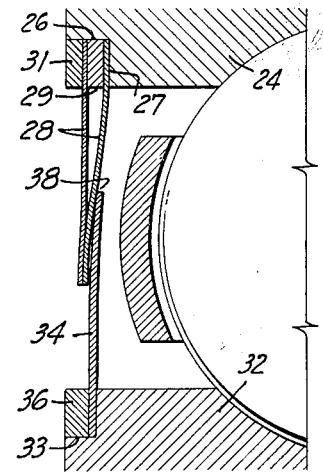
FIG_1_  FIG_2_  FIG_3_
FIG_4_  FIG_5_  FIG_6_
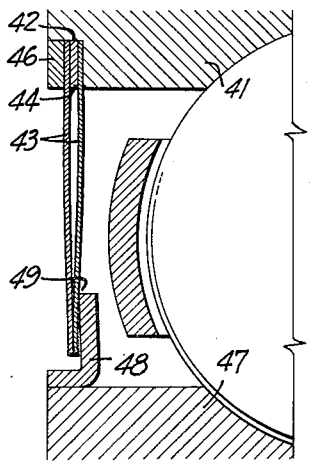
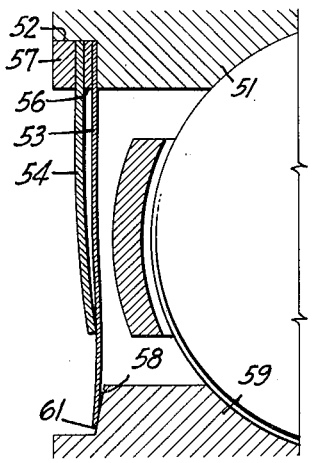
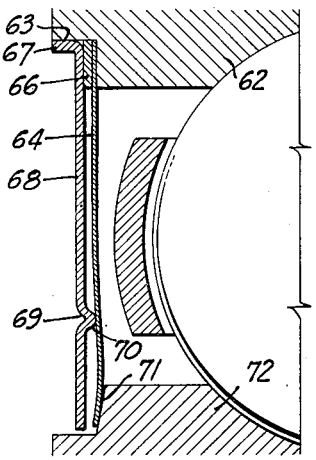
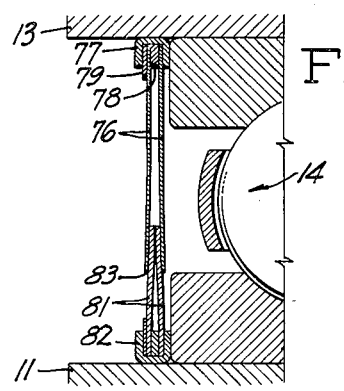
FIG_7_   FIG_8_
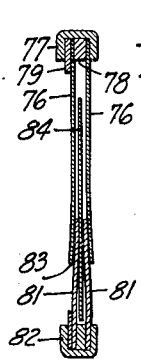
INVENTOR
Lawrence G. Saywell
BY
ATTORNEYS

United States Patent Office 2,706,650
Patented Apr. 19, 1955

2,706,650
SEALING ASSEMBLY

Lawrence G. Saywell, San Mateo, Calif., assignor to Saywell Associates, South San Francisco, Calif., a joint venture Application December 3, 1949, Serial No. 130,956

4 Claims. (Cl. 286—11)

This invention relates generally to sealing assemblies of the type suitable for sealing shafts and bearing assemblies against loss of greases or other lubricants.

In my Patent No. 2,428,041 I have shown a lubricant seal making use of annuluses formed of thin spring metal and stressed laterally to maintain sealing engagement with an associated shoulder or other annulus. In many instances where this type of seal can be used to advantage, there are theoretical advantages favoring the use of the thinner metal annuluses, particularly because of the ability of thin sheet metal to maintain sealing engagement over an entire annular area, irrespective of imperfections in the sealing surfaces and axial misalignment of the concentric members being sealed. However with assemblies of the type disclosed in said Patent No. 2,428,041, the annulus must be of sufficient thickness so that for its radial width it will provide a proper amount of pressure when stressed laterally a reasonable amount. Furthermore with assemblies of the type disclosed in said patent, there is a tendency for vibrational effects with resulting uneven wear pattern at the higher speeds of operation, when it is attempted to use annuluses which are relatively thin.

In general it is an object of the present invention to provide a lubricant seal or sealing assembly of the above type which will facilitate the use of thinner spring metal for the construction of the annuluses.

Another object of the invention is to provide a sealing assembly of the above character which will be relatively free of flutter at the higher operating speeds, and which will enable use of relatively thin sheet metal.

Another object of the invention is to provide a sealing assembly of the above character which will enable attainment of proper bearing pressures between the surfaces in sealing contact, while at the same time making possible the use of a relatively thin metal annulus or annuluses.

Additional objects of the invention will appear from the following description in which the preferred embodiments of the invention have been set forth in detail in conjunction with the accompanying drawing.

Referring to the drawing:

Figure 1 is a cross-sectional detail illustrating in enlarged scale a sealing assembly incorporating the present invention.

Figure 2 is a diagrammatic view illustrating the annuluses employed in the assembly of Figure 1, before the annuluses are assembled with other elements.

Figure 3 is a view like Figure 1 but illustrating another embodiment of the invention.

Figure 4 is a view like Figure 1 and illustrating another embodiment of the invention.

Figure 5 is a view like Figure 1 and illustrating another embodiment of the invention.

Figure 6 is a view like Figure 1 and illustrating another embodiment of the invention.

Figure 7 is a view like Figure 1 and illustrating another embodiment of the invention.

Figure 8 is a view like Figure 7 and illustrating another embodiment of the invention.

In Figure 1 of the drawing I have shown a sealing assembly 10 fitted upon the shaft 11, and disposed within the bore 12 of the outer housing 13. The shaft in this instance is shown being journaled by the ball bearing assembly 14.

The sealing assembly 10 consists of two structures, one fitted within and sealed with respect to the housing, and the other fitted upon and sealed with respect to the shaft. The outer or stator structure consists in this instance of a pair of annuluses 16 formed of relatively thin spring metal, and which have their outer peripheral margins retained within the mounting ring 17. The mounting ring can be formed of pressed sheet metal U-shaped in cross-sectional contour as illustrated. Between the outer margins of the annuluses there is a spacer ring 18.

The inner or rotor structure consists of a pair of spring metal annuluses 19, which have their inner margins carried by the mounting ring 21. Another spacer ring 22 is interposed between the annuluses 19, and is dimensioned to secure a desired amount of stressing as will be presently explained.

Before assembly, the annuluses 16 are formed dished or conical shaped as illustrated in Figure 2. The amount of dishing is such that when the two annuluses are placed together with their convex faces in opposition, the outer margins must be sprung together a substantial amount for assembly in the mounting ring 17. This stressing serves to urge the inner margins of the annuluses 16 into continuous engagement. The greatest contact pressure is between the inner edges of the annuluses, and the pressure diminishes in an outward radial direction.

Initially the inner annuluses 19 can be planar as shown in Figure 2. The spacer ring 22 is dimensioned so that when the annuluses 19 are assembled within the mounting ring 21, they are likewise stressed laterally a substantial amount so that the outer margins of the annuluses 19, which overlap the inner margins of annuluses 16, are pressed against the latter to establish sealing engagement. The area of contact between the overlapping margins of the annuluses 16 and 19 is of substantial radial extent, but the contact pressure is greatest for the regions indicated at 23, and diminishes inwardly.

The annuluses can be formed of any suitable spring metal such as high carbon steel, Phosphor bronze, or any one of the stainless steels. For shafts of the most common sizes the metal may range in thickness from say 0.002 to 0.005 inch. It will be evident that the thickness of the metal may vary in different instances, depending upon the shaft size, and the radial distance between the outer diameter of the shaft and the bore 12. Particularly it is desirable to form the rotor annuluses 19 of relatively thin metal, and although the stator annuluses 16 can be of the same thickness as the annuluses 19, it is desirable to form the annuluses 16 of somewhat heavier metal. For example the annuluses 16 can be of the order of 0.006 inch in thickness, and the inner annuluses 19 say 0.003 inch.

A sealing assembly as described above will form in effect a lubricant seal to prevent loss of either the common grades of lubricant oil, or the more viscous greases. The seal can be operated at relatively high speeds without vibrational effects and with an even wear pattern, and this is attributed to the fact that the inner margins of the annuluses 16 are stressed into direct contact. Proper sealing pressure can be maintained between the overlapping margins of the annuluses 16 and 19, with a high degree of preload between the heavier annuluses 16. Because of the use of relatively thin metal for the inner annuluses 19, the assembly is capable of accommodating considerable longitudinal movement of the shaft relative to the housing, without interfering with sealing engagement.

It will be evident that the assembly of Figure 1 can be used either as a shaft seal as illustrated, or the assembly can be directly incorporated in a ball or roller bearing assembly.

In Figure 3 a modified form of the sealing assembly is shown incorporated in a ball bearing assembly. In this case the outer race 24 of the ball bearing assembly is provided with an annular recess 26, to thereby form a shoulder 27 to facilitate mounting the parts of the seal. Two spring metal annuluses 28 are provided, and they are disposed within the recess 26, together with the spacing ring 29, and the pressed in retaining ring 31. In this instance the annuluses 28 are initially dished like the annuluses 16 of Figure 2, so that when assembled as shown in Figure 3, their inner margins are pressed together and the annuluses are stressed laterally.

The inner ball bearing race 32 is provided with an annular recess 33, which accommodates the annulus 34 and the pressed in retaining ring 36. Annulus 34 overlaps the inner one of the two annuluses 28 a substantial amount, and the dimensioning is such that either the two annuluses 28, or both these annuluses and annulus 34, are stressed laterally to provide good sealing engagement. The pressure between the surfaces in overlapping contact is greatest at the region 38, and decreases inwardly.

It will be evident that in the construction shown in Figure 3, a single seal will be formed, as distinguished from the double seal when using the assembly of Figure 1. In some instances however a single seal will suffice, particularly where a viscous lubricant or grease is being employed. In the assembly of Figure 3 the force applied by the outer margin of the annulus 34 is directly received by the inner one of the annuluses 28, and this annulus is in turn supported by the pressure exerted against its inner margin by the outer annulus 28. In this assembly the annuluses 28 can likewise be made of relatively thin metal, but in spite of the use of thin material adequate bearing forces can be maintained to establish and maintain adequate pressure between the surfaces in sealing contact. While the inner annulus 34 can be formed of relatively thin spring metal and stressed laterally, this part can be relatively rigid, whereby it forms the effect of a rigid shoulder against which the inner one of the annuluses 28 establishes sealing contact.

In the embodiment of Figure 4 the outer race 41 likewise has an annular recess 42, which accommodates the two thin spring metal annuluses 43. The outer margins of these annuluses are separated by the spacer ring 44, and they are held in place by the pressed in retaining ring 46. Annuluses 43 are dished in the manner illustrated in Figure 2 before assembly, so that after assembly they are stressed and their inner margins urged together.

The inner ball bearing race 47 of Figure 4 carries a pressed on ring 48, which can be formed of pressed metal, and which is L-shaped in cross-sectional contour. Member 48 is positioned so that its outer face presses into sealing engagement with the inner one of the annuluses 43. The proportioning is such that the greatest pressure is applied along the region 49.

In the embodiment illustrated in Figure 5, the outer race 51 has an annular recess 52, which accommodates the inner spring metal annulus 53, and the adjacent annulus 54. These annuluses are separated by the spacer ring 56, and are held in place by the pressed in retainer ring 57. The inner margin of the annulus 53 is dimensioned to overlap and be pressed into sealing engagement with the annular shoulder 58 formed on the inner ball bearing race 59. The inner annulus 53 is formed of relatively thin spring metal, the same as the annulus 16 of Figure 1. Likewise the outer annulus 54 can be formed of spring metal, but its inner diameter is greater than the inner diameter of the annulus 53, and it is dished so that its inner peripheral edge bears upon the outer face of the annulus 53 and thus stresses the annulus 53 laterally. By virtue of this stressing the inner margin of annulus 53 is normally pressed into sealing engagement with the shoulder 58, the greatest pressure being applied to the region 61.

Instead of forming the outer annulus 54 (Figure 5) of spring metal and sufficiently thin so that it is normally laterally stressed, this part can be made of relatively thick material so that it is substantially rigid. When so formed the annulus 54 is not deflected laterally, and it serves in effect as a rigid protective guard to prevent injury to the thin metal annulus 53. Likewise it is desirable in this connection to dimension the annulus 54 so that its inner diameter is either less or of substantially the same diameter as the outer edge of shoulder 58. In order to secure graduated loading between the annuluses 53 and shoulder 58, with maximum pressure being applied in the region 61, it is desirable to provide a slight bevel for the shoulder 58 as illustrated. For example this shoulder can be formed on an angle of say 5° to a plane at right angles to the axis of the bearing. The inner margin of the annulus 53 will be bent somewhat against the shoulder 58, in order to provide an area of contact between the adjacent surfaces which is of substantial radial extent, as distinguished from a substantially line contact.

Figure 6 illustrates a construction somewhat similar to Figure 5, but in which the outer annulus affords more complete protection for the inner spring metal annulus. Thus in this instance the outer race 62 is provided with a recess 63, which accommodates the thin metal annulus 64, the spacing ring 66, and the outer edge portion 67 of the annulus 68. The outer annulus 68 can be formed of relatively rigid sheet metal having an outer turned edge portion 67 formed on its outer periphery, and dimensioned for a press fit in the recess 63. Annulus 68 extends substantially completely across the face of the spring metal annulus 64, and is dished or provided with a circular ridge 69 to press against the spring metal annulus in the annular region indicated at 70. The proportioning is such that the pressure between the annuluses causes the inner spring metal annulus 64 to be deflected and stressed laterally, whereby its inner margin is pressed into sealing engagement with the shoulder 71 formed on the inner race 72.

Figure 7 shows an embodiment somewhat similar to Figure 1. The spring metal annuluses 76 have their outer margins carried by the mounting ring 77, together with the spacer ring 78 and gasket ring 79. The inner margins of annuluses 76 engage the heavier annuluses 81 which are made to dished form whereby when assembled with mounting ring 82 and spacer 83, their outer margins are pressed together. The outer faces of annuluses form sealing surfaces for engaging the inner margins of the annuluses 76. Maximum sealing pressure between the overlapping margins is at the inner peripheries of annuluses 76 as indicated at 83.

As shown in Figure 8 the seal of Figure 7 can be modified to provide a reinforcing metal annulus 81 which is interposed between the annuluses 81 and which serves to reinforce the assembly against applied fluid pressures.

It will be evident from the foregoing that I have provided a variety of sealing assemblies, all of which make possible the use of relatively thin spring metal to form one or more of the sealing annuluses. In all of the various assemblies the thin metal annulus or annuluses are supported in such a manner as to enable attainment of proper sealing pressures against cooperating parts, and to avoid flutter or other objectionable effects under high speed operation.

I claim:

1. Sealing means adapted to form a lubricant seal between outer and inner relatively rotatable concentric members, comprising means on one of said members forming an annular surface, a thin spring metal annulus having one peripheral margin of the same in overlapping contact with said surface, means serving to mount the other peripheral margin of the annulus in sealed relation with said other member, and means in contact with said annulus in a continuous localized annular region spaced radially from both said mounting means and said margin and serving to maintain said annulus laterally stressed and urged into sealing contact with said surface.

2. In combination with a bearing assembly comprising outer and inner relatively rotatable concentric members, an annular sealing surface formed on one of said members, an annulus of spring metal extending between said members and having a peripheral margin of the same in overlapping relation with said surface, a second relatively rigid annulus extending in juxtaposition to one side of the first named annulus, means forming a mounting for corresponding peripheral margins of said annuluses and serving to secure the same to the other one of said members, said second named annulus having a continuous circular portion of the same spaced radially from both said mounting and said margin and engaging and deflecting one side of said spring metal annulus to urge the same into sealing engagement with said surface, said second named annulus being otherwise free from direct contact with said spring metal annulus.

3. In combination with a sealing assembly comprising outer and inner relatively rotatable concentric members, a sealing shoulder formed on the inner one of said members, an annulus formed of thin spring metal having its inner peripheral margin in overlapping relation with said shoulder and extending to the outer member, means serving to attach and seal the outer peripheral margin of said annulus with the outer one of said members, a second relatively rigid annulus mounted upon the outer one of said members and extending inwardly across the one face of said spring metal annulus, a circular portion of said last named annulus being in contact with said spring metal annulus in a localized annular region to deflect the same laterally and to thereby urge the inner peripheral margin of the same into sealing engagement with said shoulder, said region being spaced radially from both the outer member and said margin of the spring metal annulus, said second annulus being otherwise free from contact with the spring metal annulus.

4. An assembly as in claim 3 in which an inner margin of said rigid annulus extends in spaced proximity with said margin of the spring metal annulus, said circular portion being in the form of a continuous ridge.

References Cited in the file of this patent

UNITED STATES PATENTS

| | | |
|---|---|---|
| 1,891,706 | De Ram | Dec. 20, 1932 |
| 2,221,554 | Okun | Nov. 12, 1940 |
| 2,251,012 | Delaval-Crow | July 29, 1941 |
| 2,270,811 | Leonard | Jan. 20, 1942 |
| 2,428,041 | Saywell | Sept. 30, 1947 |
| 2,538,987 | Synek | Jan. 23, 1951 |